US012105290B2

(12) United States Patent
Cakmakci et al.

(10) Patent No.: US 12,105,290 B2
(45) Date of Patent: Oct. 1, 2024

(54) OPTICAL DESIGN OF A DUAL COMBINER IN HEAD-WEARABLE DISPLAY

(71) Applicant: GOOGLE LLC, Mountain View, CA (US)

(72) Inventors: Ozan Cakmakci, Sunnyvale, CA (US); Eliezer Glik, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 482 days.

(21) Appl. No.: 17/471,750

(22) Filed: Sep. 10, 2021

(65) Prior Publication Data

US 2023/0078819 A1    Mar. 16, 2023

(51) Int. Cl.
  *G02B 27/01* (2006.01)
  *F21V 8/00* (2006.01)
  *G02B 27/28* (2006.01)

(52) U.S. Cl.
  CPC ....... *G02B 27/0172* (2013.01); *G02B 6/0033* (2013.01); *G02B 27/283* (2013.01); *G02B 2027/013* (2013.01); *G02B 2027/0178* (2013.01)

(58) Field of Classification Search
  CPC .......... G02B 27/0172; G02B 2027/013; G02B 2027/0125; G02B 2027/0123
  See application file for complete search history.

(56) References Cited

U.S. PATENT DOCUMENTS

| | | | |
|---|---|---|---|
| 10,551,616 B2 | 2/2020 | Wall et al. | |
| 2012/0212398 A1 | 8/2012 | Border et al. | |
| 2014/0232651 A1 | 8/2014 | Kress et al. | |
| 2016/0357016 A1 | 12/2016 | Cakmakci et al. | |
| 2017/0357090 A1* | 12/2017 | Martinez | G02B 27/0172 |
| 2020/0132919 A1 | 4/2020 | Cakmakci | |
| 2020/0166753 A1 | 5/2020 | Vallius et al. | |
| 2020/0183169 A1 | 6/2020 | Peng et al. | |
| 2022/0121034 A1 | 4/2022 | Qin et al. | |

FOREIGN PATENT DOCUMENTS

JP    2015226110 A    12/2015

OTHER PUBLICATIONS

International Search Report and Written Opinion mailed Nov. 25, 2022 for PCT Application No. PCT/US2022/039425, 14 pages.
International Preliminary Report on Patentability mailed Mar. 21, 2024 for PCT Application No. PCT/US2022/039425, 8 pages.

* cited by examiner

*Primary Examiner* — Ryan D Howard

(57) ABSTRACT

A head-wearable display device is configured to support a plurality of combiners (e.g., at least two combiners) to expand an eyebox associated with the head-wearable display device. The plurality of combiners may expand the pupil and the head-wearable display device may be configured to align the magnification between the plurality of combiners, such that a single magnified virtual image with an expanded eyebox may be delivered to the user.

19 Claims, 5 Drawing Sheets

OPTICAL DESIGN OF A DUAL COMBINER IN HEAD-WEARABLE DISPLAY

BACKGROUND

Head-wearable display devices have increasingly become a useful way of supporting user interaction with various applications, such as virtual reality applications, augmented reality applications, and the like. The head-wearable display devices may display information, generated by one or more of the various applications, by projecting images onto a display surface (e.g., a microdisplay). The head-wearable display devices may allow the user to view the external environment through a lens or the display surface. In some cases, the display surface may be positioned in a temple or rim region of a frame of the head-wearable display devices. The display surface generates and displays information, such as computer-generated images that are conveyed into a field of view of the user by optical elements such as curved lightguides deployed in the lens (or the display surface) of the frame. The head-wearable display devices may therefore serve as a hardware platform for supporting user interaction with various applications.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Various aspects of the present disclosure relate to techniques for a dual combiner in a wearable display device (also referred to as a head-wearable display device or a head mounted display device). The head-wearable display device may be configured to support a curved lightguide including a set of combiners (e.g., at least two combiners) to support a relatively large eyebox associated with the head-wearable display device, wherein the eyebox represents the three-dimensional volume in space within which the user's pupil is positioned to view the magnified virtual image. In some embodiments, the set of combiners expands the pupil associate with the head-wearable display device, and the device may be configured to align the magnification between the set of combiners, such that a single magnified virtual image eyebox may be delivered to the user within a relatively large eyebox. Further, the two or more combiners support the use of a relatively thin lightguide for the relatively large eyebox, thereby allowing for lighter and more compact head-wearable display devices. For example, using the techniques described herein, the micro-display of a head-wearable display device can be located in the temple portion of the device while supporting an acceptably thin lightguide to deliver the displayed images to the user.

Figure 1:
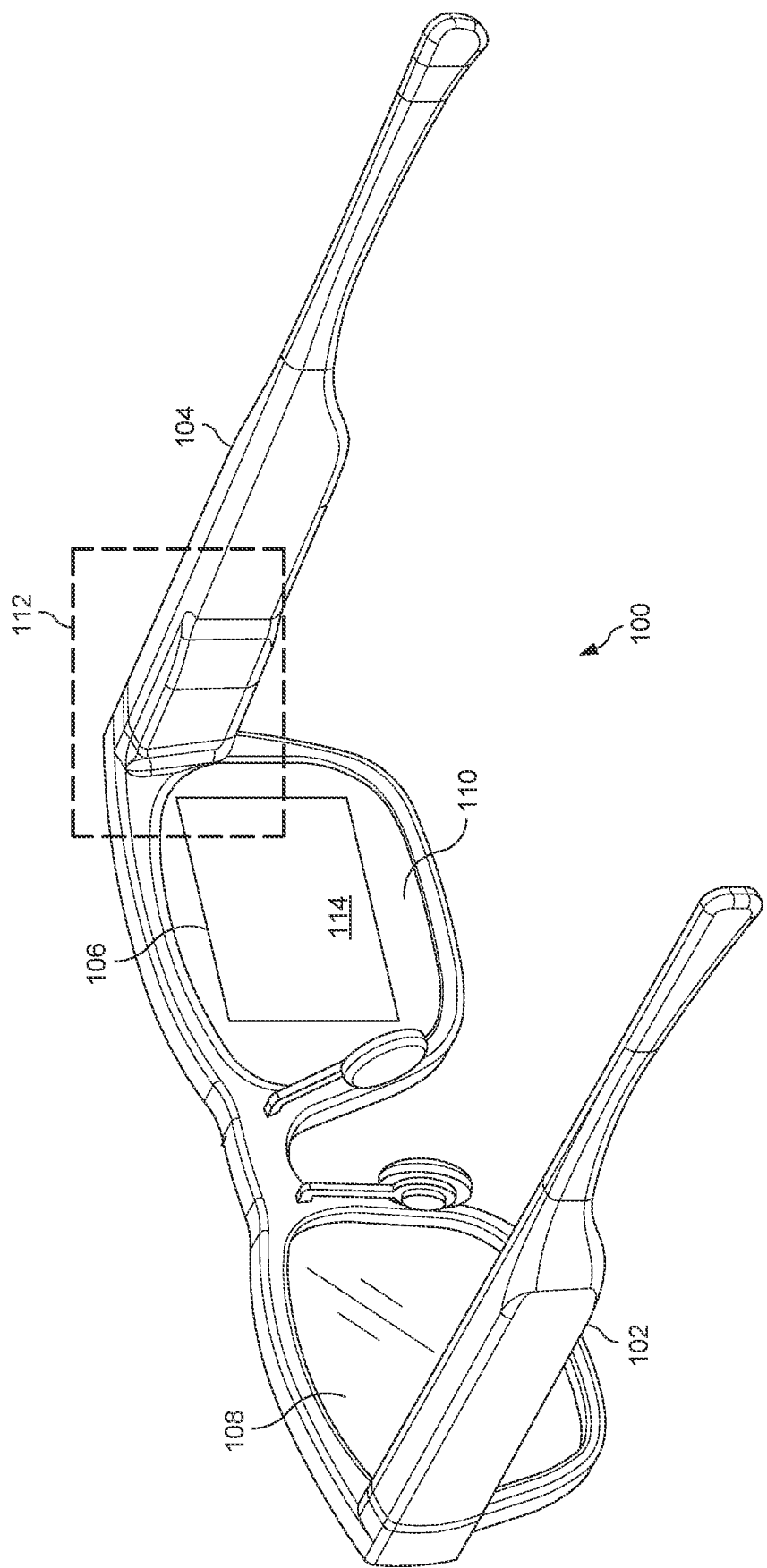
FIG. 1 is a block diagram of a wearable display device that employs a dual combiner in accordance with embodiments of the present disclosure.

FIG. 1 is a block diagram of a wearable display device 100 that supports techniques for a dual combiner in head-wearable display devices in accordance with embodiments of the present disclosure. The wearable display device 100 may include an arm 104, which houses a laser projection system configured to project images toward the eye of a user, such that the user perceives the projected images as being displayed in a field-of-view area 106 of a display at one or both of lens elements 108, 110. The wearable display device 100 may be a near-eye display system in the form of a wearable display device, in which a support structure 102 is configured to be worn on the head of a user and has a general shape and appearance (that is, form factor) of an eyeglasses frame. The wearable display device 100 illustrates components and their arrangement for use in various types of eyewear devices that provide augment reality-based and virtual reality-based vision. The wearable display device 100 provides binocular augmented reality-based and virtual reality-based vision. The user eyes are not illustrated in this figure for sake of clarity.

The support structure 102 includes various components to facilitate the projection of images toward the eye of the user, such as a laser projector, an optical scanner, and a waveguide. In some embodiments, the support structure 102 further includes various sensors, such as one or more front-facing cameras, rear-facing cameras, other light sensors, motion sensors, accelerometers, and the like. The support structure 102 may also include one or more radio frequency interfaces or other wireless interfaces, such as a Bluetooth interface, a Wi-Fi interface, and the like. In some embodiments, the support structure 102 further includes one or more batteries or other portable power sources for supplying power to the electrical components of the wearable display device 100. In some embodiments, some or all of these components of the wearable display device 100 are fully or partially contained within an inner volume of the support structure 102, such as within the arm 104 of the support structure 102. It should be noted that while an example form factor is depicted, it will be appreciated that in other embodiments the wearable display device 100 may have a different shape and appearance from the eyeglasses frame depicted in FIG. 1.

One or both of the lens elements 108, 110 are used by the wearable display device 100 to provide an augmented reality display in which rendered graphical content can be superimposed over or otherwise provided in conjunction with a real-world view as perceived by the user through the lens elements 108, 110. For example, laser light used to form a perceptible image or series of images may be projected by a laser projector of the wearable display device 100 onto the eye of the user via a series of optical elements, such as a waveguide formed at least partially in the corresponding lens element, one or more scan mirrors, and one or more optical relays. One or both of the lens elements 108, 110 thus include at least a portion of a waveguide that routes display light received by an incoupler of the waveguide to an outcoupler of the waveguide, which outputs the display light toward an eye of a user of the wearable display device 100.

The display light is modulated and scanned onto the eye of the user such that the user perceives the display light as an image. In addition, each of the lens elements 108, 110 is sufficiently transparent to allow a user to see through the lens elements to provide a field of view of the user's real-world environment such that the image appears superimposed over at least a portion of the real-world environment. In some embodiments, the projector is a digital light processing-based projector, a scanning laser projector, or any combination of a modulative light source, such as a laser or one or more light-emitting diodes and a dynamic reflector mechanism such as one or more dynamic scanners or digital light processors. The projector includes multiple laser diodes (e.g., a red laser diode, a green laser diode, and a blue laser diode) and at least one scan mirror (e.g., two one-dimensional scan mirrors, which may be micro-electromechanical system (MEMS)-based or piezo-based.

The projector is communicatively coupled to the controller and a non-transitory processor-readable storage medium or memory storing processor-executable instructions and other data that, when executed by the controller, cause the controller to control the operation of the projector. In some embodiments, the controller controls a scan area size and scan area location for the projector and is communicatively coupled to a processor (not shown) that generates content to be displayed at the wearable display device 100. The projector scans light over a variable area designated as the field-of-view area 106 of the wearable display device 100. The scan area size corresponds to the size of the field-of-view area 106 and the scan area location corresponds to a region of one of the lens elements 108, 110 at which the field-of-view area 106 is visible to the user.

In some embodiments, the lens elements 108, 110 may be lightguides are curved, and in other embodiments, the lightguides may be substantially planar. The support structure 102 secures the lightguides between a top side and a bottom side thereof of the wearable display device 100. The frame 410 and the lens elements 108, 110 (e.g., lightguides) are shaped into a form like lenses of an ordinary pair of eyeglasses. The lens elements 108, 110 (e.g., lightguides) may be transparent and operate as lenses for viewing.

For a respective display 112, each lens element (e.g., each lightguide) includes a surface having a coating, such as a dielectric mirror coating, that combines light from the respective display 112 (sometimes referred to herein as display light) and light entering from a world side (sometimes referred to herein as world light or ambient light) are combined into a resulting image that is then directed toward the user eye at the eye-side of the wearable display device 100. The light from the world side passes through each respective lens element 108, 110 (e.g., each respective lightguide) to the eye-side of each respective lens element 108, 110 and the light originates from a viewable scene on the world-side of the wearable display device 100. In some embodiments, the coating has additional properties to improve the quality of the display provided to the user and to mitigate undesired stray light from impacting the display. For example, in some embodiments the coating can differently reflect light based on the angle of incidence (AOI) (e.g., reflect light having given angles of incidence more than light having other angles of incidence) in order to improve the quality of the display. In other embodiments, the coating can differently reflect light based on the wavelength of the light (e.g., reflect light having given wavelengths more than light having other wavelengths in order to improve the quality of the display.

Each respective display 112 may be mounted at an edge of each respective lens element 108, 110 (e.g., lightguide), at the temple location of a respective lens element 108, 110, and each respective display 112 may be positioned inside or proximate to the support structure 102 (e.g., frame). The lens element 108, 110 (e.g., lightguide) allow ambient light to combine with display light reflected at the combiner surface which is not separately labeled in this figure for sake of clarity. The placement of each respective display 112 at an outside lateral side of a respective lens element 108, 110 may be one example of placement of each respective display 112. Each respective display 112 in other embodiments may be positioned at or in a top portion of the support structure (e.g., frame). Each respective lens element 108, 110 (e.g., lightguide) may include an eye-side surface and a world-side surface. A display light may be reflected between these surfaces at least once on each surface before reaching the user eye.

Each of the respective lens element 108, 110 (e.g., lightguide) surfaces may be curved and may be spherical in at least one dimension (e.g., uniform along a fixed radius with respect to a focal point of the respective lightguide), and each of these surfaces may have a similar or approximately a same sized characteristic dimension (e.g., spherical dimension, radius, set of curvature parameters) as each other so as to implement a zero optical power (diopter) optical see-through function. The eye-side and world-side surfaces can also be designed to integrate prescription correction as part of the lightguide.

At least some of the components of the respective lens elements 108, 110 (e.g., lightguide) of the wearable display device 100 operate, due to their arrangement relative to one another and their composition and shape, as an optical magnifier for the light emitted from the display 112. In some embodiments, the wearable display device 100 may be configured with a plurality of combiners 114, which may include at least two combiners associated with each of the respective lens element 108, 110 (e.g., lightguide). The plurality of combiners 114 may function as a dual combiner to expand the pupil of the user wearing the wearable display device 100.

The wearable display device 100 may be configured to expand the pupil of the user wearing the wearable display device 100 using only a single microdisplay (e.g., the display 112). As such, the wearable display device 100 may align the magnifications between the plurality of combiners 114 (e.g., the at least two combiners), such that a single magnified virtual image with an expanded eyebox may be delivered to the user wearing the wearable display device 100. Therefore, the wearable display device 100 may be configured with a curved lightguide with two combiners to expand the eyebox (e.g., the field-of-view area 106).

In the wearable display device 100, an assembly associated with the display 112 (e.g., a microdisplay backend assembly) may be hidden in the temple of the support structure 102 while keeping an acceptable thin lightguide. In some embodiments, the eyebox (e.g., the field-of-view area 106) may traverse roughly linearly in single outcoupler curved lightguide (e.g., 4 mm eyebox for 4 mm thickness approximately). In some other embodiments, the wearable display device 100 may support a larger eyebox (e.g., doubles the eyebox at the same thickness). The wearable display device 100 may be injection molded in plastic which may reduce the cost of manufacturing the wearable display device 100.

The techniques described herein are applicable to various types of see-through devices, such as eyeglasses, helmets, head-mounted display (HMD) devices and windshields, and enable optical merging of computer generated and real-world scenes to form a combined view even though just an eyewear device such as the wearable display device 100 is described and illustrated. The techniques described herein may provide improvements to efficiency of manufacturing the wearable display device 100, image quality provided by the wearable display device 100, increasing a field-of-view of the wearable display device 100, and increasing an eyebox provided by the wearable display device 100. Additionally or alternatively, the techniques described herein may provide improvements to providing a full color display via the wearable display device 100, use of curved vs flat lightguides of the wearable display device 100, eye tracking capability of the wearable display device 100, among other benefits.

Figure 2:
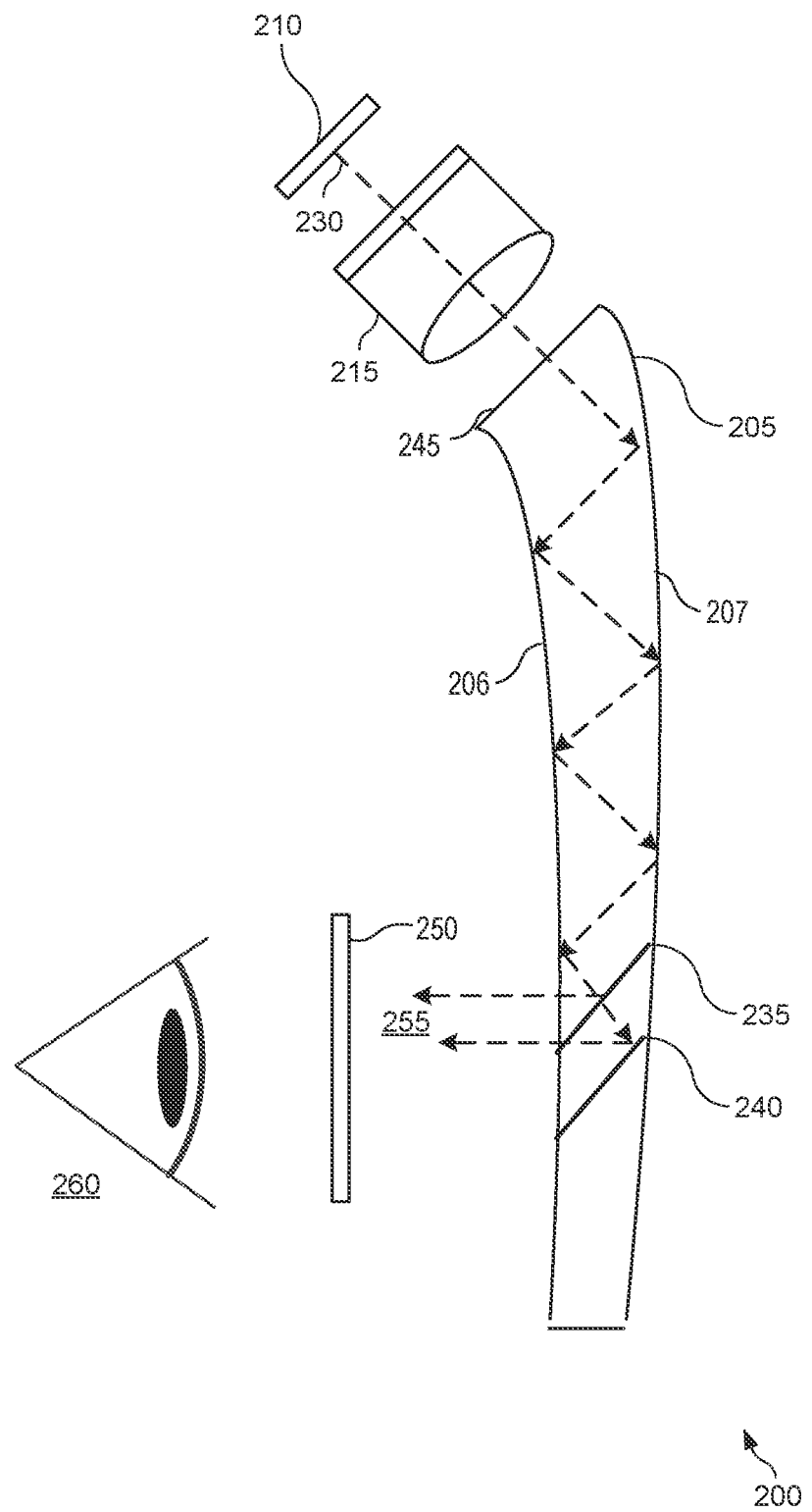
FIG. 2 is a block diagram of an example of a dual combiner in the head wearable display device of FIG. 1 in accordance with embodiments of the present disclosure.

FIG. 2 is a block diagram of a system 200 that supports techniques for a dual combiner in head-wearable display devices in accordance with embodiments of the present disclosure. In the illustrated example, the system 200 includes components of the wearable display device 100 to display images to a user. The system 200 includes a lightguide 205, a display 210, and a lens assembly 215 (e.g., a doublet lens for color correction). The display 210 may emit light 230 towards the lightguide 205. For example, the display 210 emits the light 230 from a peripheral location offset from viewing region (e.g., an eyebox 250) into lightguide 205. In some embodiments, the light generated by the display 210 is based on images provided by a computer system (not shown), a smartphone, or other electronic device. As described further herein, the system 200 directs the light to one or more eyes of the user of the wearable display device 100. The lightguide 205 is generally configured to receive light from the display 200 at an incoupler 245 (e.g., a freeform incoupler) and to direct, or guide, the light, to the user's eye 260. For example, in some embodiments the lightguide employs total internal reflection (TIR) to direct the received display light to an eyebox 250 where the images represented by the display light are visible to the user. In some embodiments, the lightguide 205 is a curved lightguide that, as described further below, employs TIR for some light reflections and for other reflections employs a coating to reflect light only partially. For example, in some embodiments, the lightguide 205 includes an eyeside surface 206 and a worldside surface 207 that are opposite each other. The eyeside surface 206 and the worldside surface 207 for the surfaces that reflect light to support the TIR operation of the lightguide 205. Further, in some embodiments each of the eyeside surfaces 206 and 207 are curved surfaces such that, if each of the surfaces 206 and 207 were extended for sufficient distance, each would form a sphere. Accordingly, the surfaces 206 and 207 are sometimes referred to as the eyeside sphere and worldside sphere, respectively.

In some embodiments, lightguide 205 may have a curvature with optical power to apply a lensing function to the light 230. That is, in some embodiments, the surfaces 206 and 207 are formed with a curvature to apply an optical power to the light 230 in order to magnify or shrink the images displayed to the user. In some embodiments, the optical power (and thus the curvature of the surfaces 206 and 207) corresponds to or is based on a vision prescription associated with a user of the wearable display device 100.

In the example of FIG. 2, the system 200 further includes a plurality of combiners, for example, a first combiner 235 and a second combiner 240, where each of the plurality of combiners is configured to combine received display light and ambient light, and to provide the combined light to an eyebox 250 where images are presented to the user's eye 260. In some embodiments, the plurality of combiners are generally configured to support a relatively large eyebox 250 for presentation of images to the user. For example, in the illustrated example of FIG. 2, the combiners 235 and 240 are offset, relative to the surfaces 206 and 207, so that the collective combined light 255 from the combiners 235 and 240 generates the relatively large eyebox 250.

In some embodiments, for each of the first combiner 235 and the second combiner 240, the same field point may produce a different image. That is, because the combiners 235 and 240 are offset, the light received from the display 210 at a given point is different, so that the combined images generated by the combiners 235 and 240 are also different. These differences can result in visual artifacts in the images displayed at the eyebox 250. To ameliorate these artifacts, the system 200 may use polarization in order to separate portions of the combined light 255. For example, in some embodiments, the display 210 includes a pre-polarizer to apply polarization (e.g., S-polarization) to the generated light, so that a portion of the light 230, associated with one part or area of the display 210, is S-polarized and another portion of the light 230, associated with a different part or area of the display 210 is P-polarized. The combiner 235 is coated with a material that reflects only S-polarized light, and transmits P-polarized light, while the combiner 240 is coated with a material that reflects only P-polarized light. This ensures that the light reflected by each of the combiners 235 and 240 represent different parts or areas of the display 210, thereby reducing or eliminating ghosting or other artifacts at the eyebox 250. In some embodiments, the coating of the combiner 235 is a dielectric interference coating. In other embodiments, the coating is a wiregrid polarizer. In other embodiments, instead of or in addition to employing coatings to reflect lights of different polarizations, the combiners 235 and 240 are formed of different materials that reflect light of the different polarizations. In still other embodiments, the combiners 235 and 240 are powered elements that, depending upon application of an electrical signal, set the type of polarized light that is reflected by each combiner, and the electrical signals are set by the system 200 so that the combiners 235 and 240 reflect lights of different polarizations.

In other embodiments, the polarization of the display 210 is time-multiplexed. For example, in some embodiments, the display 210 first provides the display light as P-polarized light for a specified period, then provides the display light as S-polarized light for another specified period, and continues to alternate provision of the display light as P-polarized light and S-polarized light. The combiner 235 is coated with a material that reflects only S-polarized light, and transmits P-polarized light, while the combiner 240 is coated with a material that reflects only P-polarized light. This ensures that the light reflected by each of the combiners 235 and 240 represent light displayed at the display 210 during the different time periods. A controller (e.g., a processor) that controls the display light (e.g., the images provided via the display) can set the display light during each of the different time periods to reduce or eliminate ghosting or other artifacts at the eyebox 250.

In other embodiments, in addition to or instead of reflecting light of different polarizations, the combiners 235 and 240 are arranged such that the for a given portion of the display 210, the rays of the display light reflected by one of the combiners 235 and 240 is reflected to the eyebox 250, while the other of the combiners 235 and 240 reflects the rays of the display light outside of the eyebox 250. Thus, for each set of rays corresponding to a portion of the display 210, only one of the combiners 235 and 240 reflects the rays to the eyebox 250, while another reflects the rays outside of the eyebox 250, thereby reducing or eliminating ghosting and other visual artifacts.

In other embodiments, at least one of the combiners 235 and 240 includes a coating or is otherwise configured to block light rays outside of an angular field of view (FOV)

associated with the eyebox 250. For example, in some embodiments the combiner 235 includes a coating that reflects light rays based on the angle of incidence (AOI) of the light rays, and the combiner 235 is arranged so that the coating reflects light rays that are outside of the angular FOV of the eyebox 250, and reflects light rays that are within the FOV of the eyebox 250. The rays that are not reflected are passed to the bottom of the lightguide 205, where the rays are absorbed by an edge absorptive coating.

In other embodiments, the combiners 235 and 240 each include a coating that only reflects light rays within a specified AOI range, and does not reflect light rays outside of the specified AOI range, so that the non-reflected rays are passed to the bottom of the lightguide 205, where they are absorbed by an absorptive coating. In some embodiments, the specified AOI range is different for each coating of the combiners 235 and 240, respectively, so that each of the combiners 235 and 240 reflects only light rays within the corresponding specified AOI range. This allows each of the combiners 235 and 240 to be arranged so that light rays that are expected to be detrimental to the quality of the display (e.g., light rays that cause a ghosting effect) are outside of the specified AOI range for each of the combiners 235 and 240, thereby improving the quality of the display.

Figure 3:
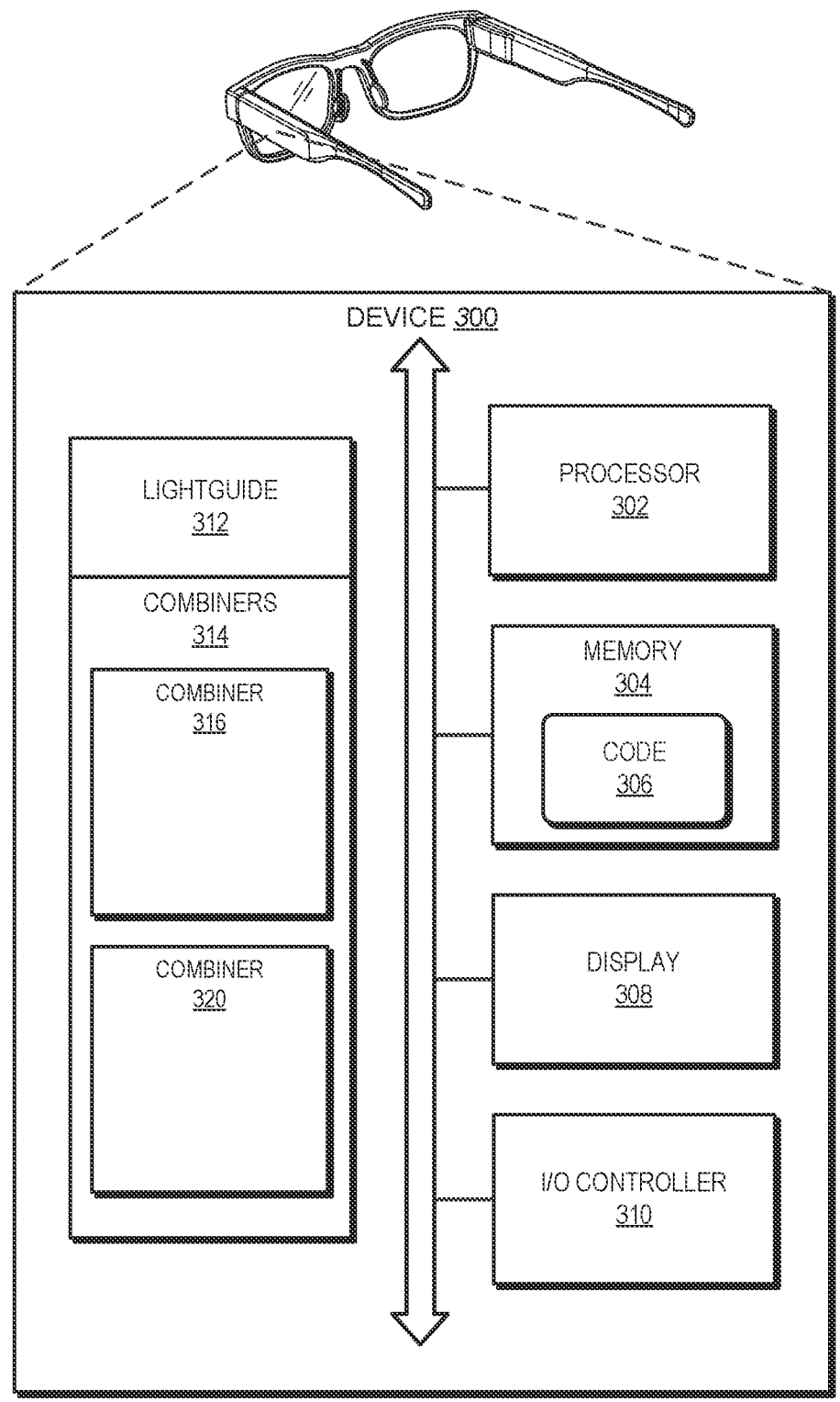
FIG. 3 is a block diagram of a head-wearable display device that supports image generation using a dual combiner in accordance with embodiments of the present disclosure.

FIG. 3 is a block diagram of a system including a device 300 that supports techniques for a dual combiner in head-wearable display devices in accordance with embodiments of the present disclosure. The device 300 may be an example of or include components of the wearable display device 100. For example, the device 300 may be a wearable display device, such as an HMD device, or the like. The device 300 may include components for information exchange including components for transmitting and receiving content, such as images and videos. The device 300 may also include components for expanding an eyebox associated with the device 300, such as a processor 302, a memory 304, a display 308, an I/O controller 310, a lightguide 312, and a plurality of combiners (also referred to as a dual combiner). These components may be in electronic communication or otherwise coupled (e.g., operatively, communicatively, functionally, electronically, electrically) via one or more interfaces.

The processor 302 may be a general-purpose processor, a digital signal processor (DSP), a central processor unit (CPU), a graphic processor unit (GPU), an image signal processor (ISP), an application-specific integrated circuit (ASIC), a field programmable gate array (FPGA), or any combination thereof. In some embodiments, the processor 302 may be configured to operate a memory array (e.g., an ISP frame buffer) using a memory controller. The processor 302 may be configured to execute computer-readable instructions stored in the memory 304 to cause the device 300 to perform various functions (e.g., functions or tasks supporting expanding a dual combiner eyebox in a curved lightguide). For example, the device 300 or a component of the device 300 may include the processor 302 and the memory 304 coupled to the processor 302, the processor 302 and the memory 304 configured to perform various functions described herein.

The memory 304 may include RAM and ROM. The memory 304 may store computer-readable, computer-executable code 306 including instructions that, when executed by the processor 302, cause the device 300 to perform various functions described herein. The code 306 may be stored in a non-transitory computer-readable medium such as system memory or other type of memory. In some embodiments, the memory 304 may contain, among other things, a BIOS which may control basic hardware or software operation, such as the interaction with peripheral components or devices. In some embodiments, the memory 304 stores one or more applications that include instructions to manipulate the processor 302 to carry out one or more specified operations, including generation of images for display at the display 308.

The display 308 may represent a unit capable of display content, such as video, images, text or any other type of content for consumption by a user (e.g., a viewer). For example, the device 300 may be configured to display content for various applications, such as augmented reality applications. In some embodiments, the display 308 corresponds to the display 210 of FIG. 2. Accordingly, the display 308 may include a liquid-crystal display (LCD), a light emitting diode (LED) display, an organic LED (OLED) display, an active-matrix OLED (AMOLED), or the like.

The I/O controller 310 may manage input and output signals for the device 300. The I/O controller 310 may also manage peripherals not integrated into the device 300. In some embodiments, the I/O controller 310 may represent a physical connection or port to an external peripheral. The I/O controller 310 may utilize an operating system such as ANDROID® or another known operating systems. In some other embodiments, the I/O controller 310 may represent or interact with the display 308. In some embodiments, a user may interact with the device 300 via the I/O controller 310 or via hardware components controlled by the I/O controller 310.

The lightguide 312 may be an optical lightguide. In some embodiments, the lightguide 312 may be an optical curved lightguide that directs one or more images towards an eye of a user when the user is wearing the device 300, as described herein with respect to, for example, FIG. 2. For example, the lightguide 312 may direct light rays representing the one or more images towards a user's eyes when the user is wearing the device 300. In some other embodiments, the lightguide 312 may be substantially planar. The lightguide 312 may be transparent and operate as lenses for viewing. In some embodiments, the lightguide 312 may be positioned in front of a user and direct light from the displays 308 toward the user eyes when the user is wearing the device 300.

The combiners 314 may include one or more of a combiner 316 and a combiner 320. The combiners 314 may be referred to as a dual combiner. In some embodiments, the combiner 316 and the combiner 320 may each be coated with a corresponding material, wherein the coating materials for the combiners 316 and 320 can be the same or different. For example, the combiners 314 may be coated by a material (e.g., a dielectric mirror coating, a polarization coating) that acts as a combiner where light from the display 305 and light entering from a world side are combined into a resulting image that is then directed toward the user eye 260 at the eye-side of the device 300.

Figure 4:
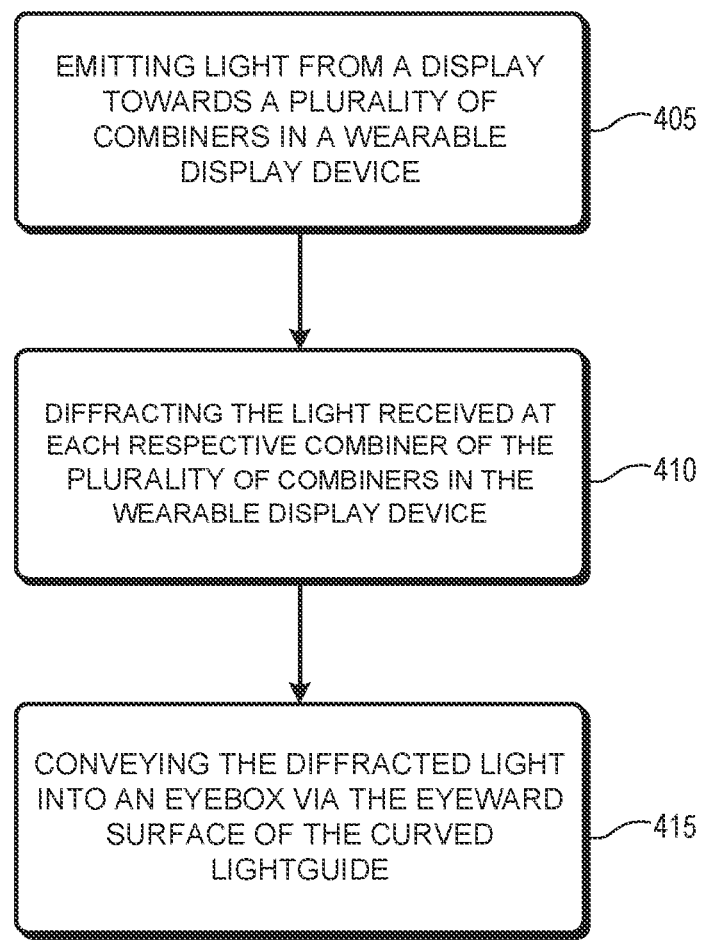
FIGS. 4 and 5 show flowcharts illustrating methods of using a dual combiner in a head-wearable display device in accordance with embodiments of the present disclosure.

FIG. 4 shows a flowchart illustrating a method 400 that support techniques for a dual combiner in head-wearable display devices in accordance with embodiments of the present disclosure. The operations of the method 400 may be implemented by a device (e.g., a wearable display device) or its components as described herein. For example, the operations of the method 400 may be performed by a wearable display device 100 as described with reference to FIG. 1. In some embodiments, a device may execute a set of instructions (e.g., code) to control the functional elements of the device to perform the described functions (e.g., expanding a dual combiner eyebox in a curved lightguide). Additionally or alternatively, the device may perform aspects of the described functions using special-purpose hardware.

At 405, the method 400 may include emitting light from a display towards a plurality of combiners in a wearable display device that comprises a curved lightguide having an outward surface and an eyeward surface, the plurality of combiners positioned along an optical path between the display and the lightguide. The operations of 405 may be performed in accordance with embodiments as disclosed herein. In some embodiments, aspects of the operations of 405 may be performed by one or more of a processor 302 and a display 308 as described with reference to FIG. 3.

At 410, the method 400 may include diffracting the light received at each respective combiner of the plurality of combiners in the wearable display device. The operations of 410 may be performed in accordance with embodiments as disclosed herein. In some embodiments, aspects of the operations of 410 may be performed by one or more of a processor 302 and a lightguide 312 as described with reference to FIG. 3.

At 415, the method 400 may include conveying the diffracted light into an eyebox via the eyeward surface of the lightguide. The operations of 415 may be performed in accordance with embodiments as disclosed herein. In some embodiments, aspects of the operations of 415 may be performed by one or more of a processor 302 and combiners 314 as described with reference to FIG. 3.

Figure 5:
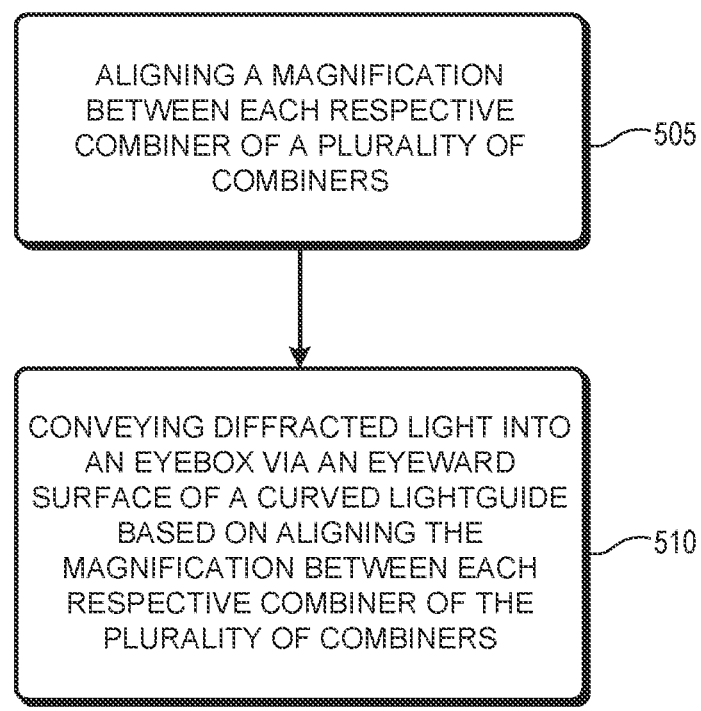

FIG. 5 shows a flowchart illustrating a method 500 that support techniques for a dual combiner in head-wearable display devices in accordance with embodiments of the present disclosure. The operations of the method 500 may be implemented by a device (e.g., a wearable display device) or its components as described herein. For example, the operations of the method 500 may be performed by a wearable display device 100 as described with reference to FIG. 1. In some embodiments, a device may execute a set of instructions (e.g., code) to control the functional elements of the device to perform the described functions (e.g., expanding a dual combiner eyebox in a curved lightguide). Additionally or alternatively, the device may perform aspects of the described functions using special-purpose hardware.

At 505, the method 500 may include aligning a magnification between each respective combiner of a plurality of combiners. The operations of 505 may be performed in accordance with embodiments as disclosed herein. In some embodiments, aspects of the operations of 505 may be performed by one or more of a processor 302 and combiners 314 as described with reference to FIG. 3.

At 510, the method 500 may include conveying diffracted light into an eyebox via an eyeward surface of a lightguide based on aligning the magnification between each respective combiner of the plurality of combiners. The operations of 510 may be performed in accordance with embodiments as disclosed herein. In some embodiments, aspects of the operations of 510 may be performed by one or more of a processor 302 and combiners 314 as described with reference to FIG. 3.

In some embodiments, certain aspects of the techniques described above may be implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A wearable display device comprising:
    a curved lightguide having an outward surface and an eyeward surface;
    a display oriented to emit light toward the lightguide; and
    a plurality of combiners positioned along an optical path between the display and the lightguide, wherein a first combiner of the plurality of combiners reflects light based on an angle of incidence of the light.

2. The wearable display device of claim 1, wherein the plurality of combiners provide different light to an eyebox associated with the wearable display device.

3. The wearable display device of claim 1, wherein a first combiner of the plurality of combiners comprises a first coating material and a second combiner of the plurality of combiners comprises a second coating material, the first coating material being different than the second coating material.

4. The wearable display device of claim 3, wherein one or more of the first coating material or the second coating material comprises a dielectric or a polarizer coating material.

5. The wearable display device of claim 1, wherein a first combiner of the plurality of combiners reflects light of a first polarization and a second combiner of the plurality of combiners reflects light of a different polarization.

6. The wearable display device of claim 5, wherein the display includes a polarizer to generate light having different polarizations for at least a portion of the display.

7. The wearable display device of claim 5, wherein the display provides display light of different polarizations in a time-sequential fashion.

8. The wearable display device of claim 1, wherein a magnification between each combiner of the plurality of combiners is aligned to generate a single virtual image at an eyebox associated with the wearable display device.

9. The wearable display device of claim 1, wherein each respective combiner of the plurality of combiners is positioned a predetermined distance from each other to generate a single virtual image at an eyebox associated with the wearable display device.

10. A method comprising:
    emitting light from a display towards a plurality of combiners in a wearable display device that comprises a curved lightguide having an outward surface and an eyeward surface, the plurality of combiners positioned along an optical path between the display and the lightguide, wherein a first combiner of the plurality of combiners reflects light based on an angle of incidence of the light;
    reflecting the light received at each respective combiner of the plurality of combiners in the wearable display device; and
    conveying the reflected light into an eyebox via the eyeward surface of the lightguide.

11. The method of claim 10, further comprising:
    wherein emitting the light from the display towards the plurality of combiners in the wearable display device is based on a separation of the plurality combiners by a predetermined distance along the optical path.

12. The method of claim 10, wherein the display comprises a single microdisplay.

13. The method of claim 10, wherein a first combiner of the plurality of combiners comprises a first coating material and a second combiner of the plurality of combiners comprises a second coating material, the first coating material being different than the second coating material.

14. The method of claim 13, wherein one or more of the first coating material or the second coating material comprises a dielectric or a polarizer coating material.

15. The method of claim 10, wherein a first combiner of the plurality of combiners reflects light of a first polarization and a second combiner of the plurality of combiners reflects light of a different polarization.

16. A set of eyeglasses, comprising:
    a curved lightguide having an outward surface and an eyeward surface;
    a display oriented to emit light toward the lightguide; and
    at least two combiners positioned along an optical path between the display and the lightguide, wherein a first combiner of the at least two combiners reflects light based on an angle of incidence of the light.

17. The set of eyeglasses of claim 16, further comprising:
    a frame that supports the lightguide, the display, and the at least two combiners.

18. The set of eyeglasses of claim 16, wherein the at least two combiners are positioned a predetermined distance from each other along the optical path.

19. The set of eyeglasses of claim 16, wherein a magnification between each combiner of the at least two combiners is aligned to provide a virtual image at an eyebox associated with the set of eyeglasses.

* * * * *

UNITED STATES PATENT AND TRADEMARK OFFICE
CERTIFICATE OF CORRECTION

| | | |
|---|---|---|
| PATENT NO. | : 12,105,290 B2 | Page 1 of 1 |
| APPLICATION NO. | : 17/471750 | |
| DATED | : October 1, 2024 | |
| INVENTOR(S) | : Ozan Cakmakci et al. | |

It is certified that error appears in the above-identified patent and that said Letters Patent is hereby corrected as shown below:

In the Claims

Column 12 Line 09, Claim 11, please correct "of the plurality combiners" to be --of the plurality of combiners--

Signed and Sealed this
Twenty-first Day of October, 2025

John A. Squires
*Director of the United States Patent and Trademark Office*